United States Patent [19]

Gross

[11] 4,120,720

[45] Oct. 17, 1978

[54] COMBINED MEANS FOR ACCURATELY POSITIONING ELECTROSTATOGRAPHIC RECORDING MEMBERS DURING IMAGING AND MEANS FOR ESTABLISHING ELECTRICAL CONNECTION WITH THE INTERMEDIATE CONDUCTIVE LAYER THEREOF

[75] Inventor: Frank C. Gross, Wilbraham, Mass.

[73] Assignee: Scott Paper Company, Philadelpia, Pa.

[21] Appl. No.: 434,399

[22] Filed: Jan. 18, 1974

[51] Int. Cl.[2] .......................... G03G 5/04; C23B 5/50; B41M 3/08; H02G 3/04

[52] U.S. Cl. .................................... 96/1.5 N; 29/625; 174/98; 427/43; 427/123; 427/97

[58] Field of Search .......................... 96/1.5, 36.2, 15; 174/68.5, 98; 117/217, 216, 212; 29/625; 427/97, 43, 123, 82

[56] References Cited

U.S. PATENT DOCUMENTS

| | | | |
|---|---|---|---|
| 2,277,013 | 3/1942 | Carlson | 96/1.5 |
| 2,385,599 | 9/1945 | Ball et al. | 96/15 |
| 2,907,925 | 10/1959 | Parsons | 317/101 |
| 2,965,952 | 12/1960 | Gillett et al. | 96/36.2 X |
| 3,077,511 | 2/1963 | Bohrer et al. | 174/68.5 |
| 3,118,789 | 1/1964 | Wiswell et al. | 117/213 |
| 3,552,957 | 1/1971 | Hodges | 96/1.5 |
| 3,783,021 | 1/1974 | York | 117/217 X |

OTHER PUBLICATIONS

National Bureau of Standards, Circular 468, "Printed Circuit Techniques", Nov. 15, 1947, p. 29.

*Primary Examiner*—Dennis E. Talbert, Jr.
*Assistant Examiner*—L. Falasco
*Attorney, Agent, or Firm*—Joseph H. Yamaoka; John W. Kane, Jr.

[57] ABSTRACT

In an electrostatographic recording member comprising at least:

(1) an electrically-insulating substrate;
(2) an electrically-conductive intermediate layer overlying a first surface of said substrate; and
(3) an electrically-insulating outer layer overlying said conductive layer, said outer layer containing a photoconductive material or being composed of a dielectric material of high volume resistivity;

the improvement comprising a combined means for accurately positioning said recording member during imaging thereof and for establishing an electrical ground connection to said intermediate conductive layer, said combined means comprising at least two separate holes through said recording member in a non-image area thereof and a conductive lacquer coating on the inner surface of at least one of said holes, said holes being adapted to receive protrusions during imaging to accurately position said recording member and said conductive lacquer being in electrical contact with the exposed intermediate conductive layer on the inner surface of said hole.

10 Claims, 8 Drawing Figures

COMBINED MEANS FOR ACCURATELY POSITIONING ELECTROSTATOGRAPHIC RECORDING MEMBERS DURING IMAGING AND MEANS FOR ESTABLISHING ELECTRICAL CONNECTION WITH THE INTERMEDIATE CONDUCTIVE LAYER THEREOF

BACKGROUND OF THE INVENTION

1. Field of the Invention

The present invention relates generally to electrophotographic and electrographic recording elements, and more particularly to a combined means for both making electrical contact with the intermediate conductive layer of such elements and also for providing means for accurately positioning the recording element during imaging thereof.

2. Description of the Prior Art

As used in the present specification, the term "electrostatographic" is intended to mean and cover both electrographic and electrophotographic members.

Both types of recording elements are employed in reproduction processes. Essentially, a latent image is formed in these elements by providing an imagewise surface charge on an insulating surface of the element, and thereafter developing the charged latent image by means of an electrically-attractable material, such as a "toner" (i.e., directionally charged colloid carbon particles suspended in an insulating liquid or on a dry carrier).

Specifically, an electrophotographic element normally comprises at least a substrate having coated thereon a layer containing a suitable photoconductor. The support layer is made conductive either by the inclusion therein of electrically-conductive materials or by coating its surface (the surface designed to receive the photoconductive layer) with an electrically-conductive material. Images are usually formed on the photoconductive layer by first applying a uniform electrostatic charge to the photoconductive layer by any suitable method, thereafter imaging the charged material by exposing it to light through a transparent master or by reflection from an opaque master which is being reproduced, thereby causing the photoconductive layer to become conductive, resulting in the dissipation of the charge in those areas of the layer exposed to light. In a subsequent step, the charge pattern or latent image on the image layer is rendered visible by the application thereto of a colored or black electroscopic toner.

An electrographic recording element is similar in construction to the electrophotographic element, with the photoconductive layer being replaced with a high dielectric layer or a "charge retentive layer," that is, a material having a volume resistivity of not less than about $10^{12}$ ohm-centimeters. During this "printing process the electrical charge is applied in the image areas by a stylus and developed in the same manner as the electrophotographic element.

With either type of element, it is often desirable during one or more of the processing steps (e.g. during charging or during toning) to establish a ground connection (to a reference potential) to the conductive layer of the recording element in order to create a highly conducting reference plane which is held at or near ground potential. For example, during the charging of the photoconductive layer or during the "printing" of the dielectric layer, the potential of the conducting layer has a tendency to build-up with respect to ground if it is not grounded. If this should occur, then there is a less than desirable difference in potential between the areas struck by light and those not struck in an electrophotographic element, and between the areas retaining or not retaining "print" charges in an electrographic element, resulting in a latent image which is difficult to develop in the subsequent toning step, thereby resulting in copies which exhibit poor image quality, high background discoloration and/or poor contrast.

In addition to assuring proper electrical grounding of the conductive layer in such elements, it is also important to ensure that the recording member is accurately positioned during imaging thereof. Normally, this is accomplished by providing a plurality of holes, such as two holes, in non-image areas of the recording member. In a recording sequence, a selective area of the recording member may be exposed to an original, and the recording member may be adapted to receive a plurality of such images in a plurality of selective areas. An example is a fiche or microfilm, adapted to receive a number of images on preselected areas thereof. In order to assure that the recording member is initially properly positioned and that during each subsequent imaging step the proper area of the recording member is imaged, it is important to originally accurately position the recording member in the apparatus. This is usually accomplished by placing the recording member on the apparatus such that pins or other like protrusions disposed on the apparatus extend into and through the holes provided in the non-image areas of the recording member. Once this is accomplished, means are usually provided for holding the recording member against the apparatus and for providing relative movement between the imaging apparatus and the recording member for selectively imaging the preselected areas of the recording member. See, for example, the apparatus described in U.S. Pat. No. 3,972,610 assigned to the assignee of the present invention.

The prior art is replete with suggestions as to how to assure proper electrical grounding of the conductive layer in such elements. The classical approach is to provide an electrically-conductive substrate which is easy and conventional if the substrate is a permeable or non-homogeneous substrate such as paper, since the substrate can be filled during manufacture with an electrically-conductive pigment such as carbon black, or saturated with a solution of an ionic, hygroscopic substance, such as salt of a polyelectrolyte. However, there are disadvantages in such a technique. For example, the ionic hygroscopic impregnant is not generally effective in low porosity papers and the conductivity it imparts is not stable but varies by several orders of magnitude with the relative humidity of the environment. The use of carbon black as a filler insures the stability of the conductivity, but may be unacceptable for aesthetic reasons, especially if a white substrate is desired. Moreover, it tends to weaken the substrate physically. Finally, it must be formulated into the substrate at the time of manufacture and thus, cannot be applied to separately made substrates. In addition, the primary disadvantage of this technique is that it cannot be applied to homogeneous, impermeable substrates, such as extruded or cast films made from, for example, synthetic resins such as polyesters.

A further approach has been to provide a conductive intermediate layer between a non-conducting substrate and the photoconductive or dielectric layer. It has been suggested to contact this conductive intermediate layer by removing the dielectric or photoconductive layer from a limited area thereby exposing the intermediate conductive layer so that an electrode can be physically contacted with the conductive layer. Other approaches have been to cut, punch, scratch or otherwise disrupt the physical integrity of the dielectric or photoconductive layer with an electrode which is forced into contact with the intermediate conductive layer.

A further alternative of the prior art has been to provide a conductive pathway established from the conductive layer to the outer surface of the member where an electrode can establish contact with it. Since it is a part of the recording member, it must be inexpensive to apply, inconspicuous, flexible (in flexible recording elements) and of course both effective and reliable.

An example of the prior art's solutions to this problem is shown in U.S. Pat. No. 3,118,789, Wiswell et al. The patent discloses an electrophotographic recording member comprising a paper substrate, a conductive interlayer and a photoconductive layer overlying the conductive interlayer with, optionally, a conductive layer coating the back side of the paper substrate. The paper substrate is perforated with fine holes so that the conductive lacquer of which the conductive interlayer is composed will penetrate through the paper during the coating operation and thus enable the establishment of an electrical connection therethrough to the conductive interlayer. A disadvantage with this type of electrical connection is that it is not useful with impermeable substrates such as polyester films. If the substrate is a film, and transparency and use as a photographic member is required, the methods suggested in the Wiswell et al patent cannot be employed to establish contact with the conductive interlayer because of the damage such a technique will cause to the film's optical characteristics.

Another solution to the problem is disclosed in U.S. Pat. No. 3,639,121, York. The patentee discloses electrophotographic elements comprising a support, an intermediate conducting layer and an uppermost photoconductive layer wherein electrical contact to the conducting layer is accomplished by coating the edge of the laminate with a conducting lacquer, which coating can be connected to ground to thereby electrically ground the intermediate conducting layer.

U.S. Pat. No. 3,533,692, Blanchette et al, discloses a photoconductive medium wherein the photoconductive layer is removed from an area to expose the conductive interlayer, with which contact is then made with an electrode, or in which a conductive metal strap or rivet is used to establish an electrical connection between the interlayer and a conductive area coated on the back of the laminate.

U.S. Pat. No. 3,552,957, Hodges, discloses the use of mechanical devices such as straps, clamps and rivets applied to an exposed area of the conductive interlayer of an electrophotographic recording member to establish electrical connection with the interlayer.

Similarly, U.S. Pat. No. 3,574,615, Morse, discloses a connection scheme as in Hodges except that an electrically-conductive elastomeric pad is inserted between the clamp-electrode and the exposed surface of the conductive interlayer.

Further, U.S. Pat. No. 3,543,023, Yellin et al, eliminates the necessity for stripping the dielectric or photoconductive layer away to expose the conductive interlayer, and discloses instead the use of a corona discharge at the edge of the member to establish the necessary electrical connection.

A disclosure related to the above discussed York patent appears in U.S. Pat. No. 3,684,503, Humphriss et al. Humphriss et al achieves the necessary electrical connection by providing, in a non-recording section of the element, a solid dispersion of a particulate electrically conducting material which extends from an external surface of the element through a portion of at least one of the layers overlying the conductive layer to electrically contact the conducting layer. Alternatively, the dispersion can extend into the element from an edge thereof.

Although the prior art recording members generally function as intended, there has been a need for a technique of providing the necessary electrical ground connection to the conductive interlayer in an electrostatographic recording member which is simple to fabricate and yet is effective in establishing good electrical connection with the conductive interlayer.

SUMMARY OF THE INVENTION

It is therefore a primary object of the present invention to provide an improved technique for making effective electrical contact with the intermediate electrically-conductive layer of such electrostatographic recording elements, including both electrophotographic recording members and electrographic recording members.

It is a further object of the present invention to provide such an electrical connection means combined with a means for accurately positioning the recording member during imaging thereof in an apparatus designed for this purpose.

The present invention accomplishes the above objects by coating the inner surfaces of at least one of the holes located in the non-image areas of the recording member which are used to accurately position the recording member during imaging with a conductive lacquer coating. The result is a means which simultaneously allows good electrical contact to be made with the intermediate electrically-conductive layer of the recording element and provides for accurate positioning of the recording member during imaging in an apparatus designed for this purpose. The present invention therefore enables the recording element to be positioned accurately for imaging repeatedly within close tolerances and also provides a means for effectively grounding the intermediate conductive layer of the recording member during imaging and developing. The present invention is advantageous in that it provides a simple yet effective technique for accomplishing these dual functions.

Other objects and advantages will be apparent to those skilled in the art from a consideration of the description of the preferred embodiments which follows, when taken in conjunction with the accompanying drawings.

BRIEF DESCRIPTION OF THE DRAWINGS

FIG. 6 being taken along the line 5—5 of FIG. 4*a.*

DESCRIPTION OF THE PREFERRED EMBODIMENTS

Figure 2:
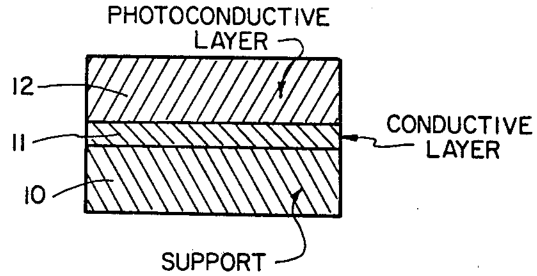
FIGS. 2 and 3 schematically show, in cross-section, alternative embodiments of conventional electrophotographic recording members.
Figure 3:
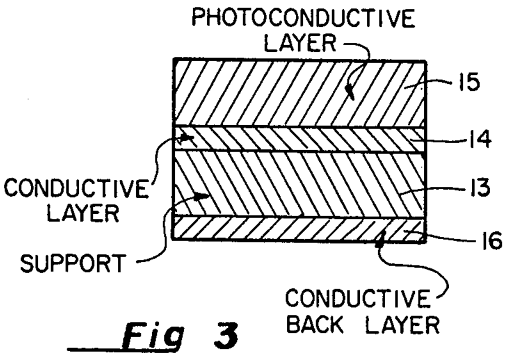

As pointed out above, the present invention is applicable equally to electrophotographic recording members as well as electrographic recording members. Examples of the former are shown in FIGS. 2 and 3 of the drawings. Referring to FIG. 2, a support 10 is coated with a conductive layer 11 which in turn is coated with a photoconductive layer 12. The support is normally electrically insulating and may comprise any of the well known materials used for such purposes. Any conventional conductive materials may be employed to render layer 11 electrically conductive, or, alternatively the conductive layer 11 may comprise a plated metallic or other conductive layer coated onto support 10. Similarly, any conventional photoconductive material may be used to form layer 12, and any conventional binder may be employed in photoconductive layer 12 and in conductive layer 11.

To assure good adhesion between the conducting layer and the support, if the two materials used are not capable of exhibiting good adhesion to one another, an adhesive layer (not shown) may be interposed between the conducting layer and the support, as is conventional.

FIG. 3 shows an alternative embodiment wherein support 13, conductive layer 14, and photoconductive layer 15 correspond, respectively, to layers 10, 11 and 12 in FIG. 2. The electrophotographic recording member shown in FIG. 3 has an additional conductive layer 16 on the opposite side of the support from the other conductive layer. The conductive layer 16 functions as a ground for the element and replaces an exterior electrode which would be required with the recording member shown in FIG. 2.

Electrographic recording members are similar in structure to the electrophotographic recording members shown in FIGS. 2 and 3. In essence, the photoconductive layer 12 of the electrophotographic recording member shown in the figures would be replaced with a dielectric layer having a high volume resistivity, normally higher than $10^{12}$ ohm-centimeters. Any conventional dielectric material can be employed as is apparent to those skilled in the art.

With either the electrographic or the electrophotographic recording members, it is important to electrically connect the conducting layer 11 to ground during the charging and development of the uppermost layer. If the conducting layer is not electrically grounded, the difference in potential between the upper layer and the conducting layer diminishes as a result of the build-up of charge in the conducting layer. The more equal charge between the two layers diminishes the quality and clarity of the image since the imaged areas in the upper layer have less of a tendency to selectively attract the developing material, as compared to the non-imaged areas, due to the small difference in potential between the upper layer and the conducting layer. If the conducting layer is properly grounded, the difference in potential is significant and therefore the imaged areas are easily capable of attracting the electrically-directed developing material, the toner, thereby producing a clear and high quality image.

Figure 1:
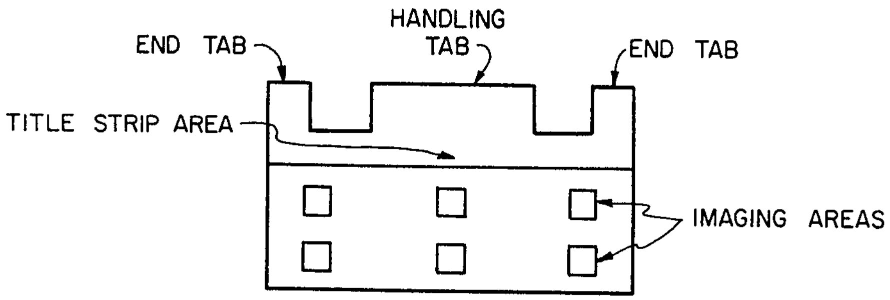
FIG. 1 shows a plan view of a conventional electrostatographic recording element or fiche.

Referring again to the drawings, FIG. 1 shows a conventional electrostatographic recording member, known as a "fiche". The bulk of the body thereof comprises a plurality of imaging areas which are separate and distinct from each other and which are each adapted to receive information thereon by the reproduction process described above. This type of fiche is best known as a "microfilm" card, each imaging area thereon being capable of receiving an image with the entire recording member being capable of receiving a plurality of such images depending upon the number of imaging areas contained therein. An area is provided along the top of such recording elements normally designed to receive a title or some other kind of identification of the subject matter contained in the imaging areas of the recording member. A handling tab is provided in the center of the top of the recording element to permit one to handle the recording element without fear of damaging the information contained in the imaged areas. Such recording elements are also normally provided with end tabs or ears as is shown in FIG. 1.

Essentially, the present invention provides for a combined means for establishing an electrical ground connection to the intermediate conductive layer of such recording elements while at the same time providing means for accurately positioning the recording element in an apparatus during imaging. The importance of the latter is evident by referring to FIG. 1, since if the initial positioning of the recording element in an apparatus designed to image the respective imaging area is not accurate, the possibility exists that the imaging areas of the recording element will not be presented accurately during the imaging step of the reproduction sequence with the result that the information will not be contained uniformly or accurately in the imaging areas.

Figure 4A:
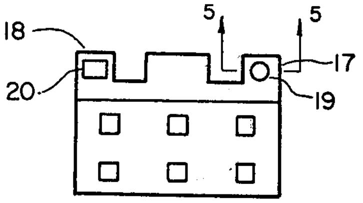
FIGS. 4*a*, 4*b* and 4*c* illustrate alternative embodiments of the combined means of the present invention.
Figure 5:
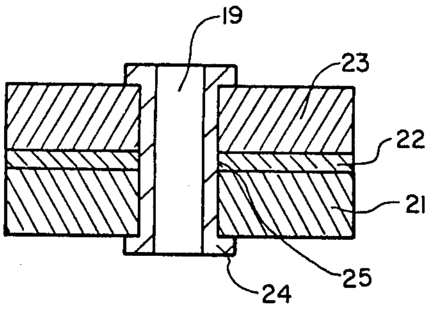
FIG. 5 schematically illustrates, in cross-section, the combined means of the present invention, FIG. 5 being taken along the line 5—5 of FIG. 4*a.*

The invention therefore solves both of these problems simultaneously. The preferred embodiment of the present invention is shown in FIGS. 4*a* and 5. Referring to the former figure, two holes 19 and 20 are provided in the respective end tabs 17 and 18, these holes extending through the entire thickness of the recording member. The inner surface of at least one, preferably both, of the holes in the end tabs (which, of course, are in non-image areas of the recording member) is coated with a conductive lacquer composition to thereby establish good electrical contact with the intermediate conductive layer of the recording element which is exposed on the inner surface of the holes. Normally, it is preferable to provide two holes in the recording element, although more than two holes may be provided if desired, in which case all of the holes may have their inner surfaces coated with the conductive lacquer.

FIG. 4*a* also indicated the preferred embodiment of one hole (19) being circular and the other being elongated (20), in order to accurately position the recording element in the apparatus designed to selectively image the respective imaging areas contained therein. Use of the elongated hole 20 enables larger tolerance in placing the holes.

FIG. 5 shows, in cross-section, the recording element shown in FIG. 4*a,* FIG. 5 being taken along the line 5—5 in FIG. 4*a.* Referring to FIG. 5, a support 21 is shown carrying thereon an intermediate conductive layer 22 onto which is superposed a photoconductive layer 23 (it will be apparent that the following description will also hold for electrographic recording members wherein photoconductive layer 23 will be replaced by a dielectric layer of high volume resistivity). From FIG. 5, it is seen that hole 19 has been covered on its inner surface with a conductive lacquer 24 establishing electrical connection with the intermediate conductive layer 22 at interface 25 between lacquer 24 and the conductive layer 22. It will be appreciated that the arrangement shown in FIG. 5 enables any build-up of potential in conductive layer 22 to be dissipated through the conductive lacquer 24 to ground (such as by contact with the apparatus used in the imaging thereof) thereby assuring a high quality image.

Figure 6:
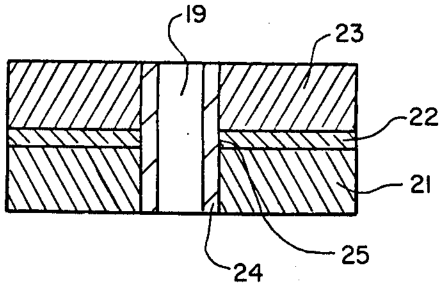
FIG. 6 schematically illustrates, in cross-section an alternative embodiment of the present invention.

FIG. 6 shows an alternative embodiment wherein the reference numerals refer to the same elements as in FIG. 5. The conductive lacquer 24 as shown in FIG. 6 covers only the inner surface of the hole 19 rather than extending onto the opposite surfaces of the recording element as shown in FIG. 5. The arrangement shown in FIG. 5 is preferable, however, since the "shoulders" which extend onto the opposite surfaces of the recording element assist in providing better electrical contact with the intermediate conductive layer 22. However, the arrangement shown in FIG. 6 is within the scope of the present invention.

Figure 4B:
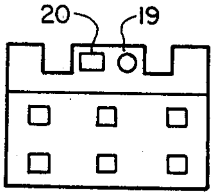
Figure 4C:
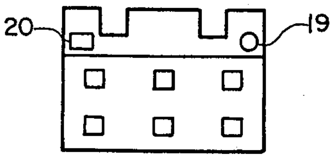

As stated above, FIG. **4*a* shows the preferred embodiment of the present invention wherein the holes are provided in the end tabs or ears of the recording element. FIGS. 4*b* and 4*c*** show alternative embodiments where, respectively, the aligning and grounding holes are provided in the handling tab and in the title strip area. It is possible to provide these holes in literally any non-image area of the recording element.

Any suitable coating technique may be employed to coat the conductive lacquer onto the inner surfaces of the holes provided in the recording element of the present invention. The particular method used to coat the holes is not critical and does not form a part of the present invention per se.

In addition, the composition of the conducting lacquer employed is not particularly critical, and it is not intended to limit the present invention to any particular conductive lacquer, rather it is intended to cover any conductive lacquer which (1) is compatible with conventional electrostatographic recording elements, (2) is capable of being applied to the inner surfaces of the holes provided in the same and (3) is capable of conducting electric current to provide an effective ground connection to the intermediate conductive layer of such electrostatographic recording elements.

The electrically-conductive lacquer composition can generally be defined as a dispersion of an electrically-conductive pigment in a binder therefor. The electrically-conductive material or pigment dispersed in the binder can be any finely divided particulate material having good electrical conducting properties. Suitable conducting materials include carbon blacks, graphite, acetylene black, metal particles such as nickel or silver, semi-conductive materials, etc. The particular electrically-conductive pigment or material used is not critical. It is present in the composition in an amount of at least the minimum required to render the composition electrically conductive. In addition, the particle size of the electrically-conductive pigment is not critical and can vary as desired depending upon the particular material used and the end use required. Generally, the particle size of these materials will vary from a range of from 5 to 200 millimicrons. Those skilled in the art can determine the optimum particle size with a minimum degree of experimentation using methods well known to those skilled in the art.

The binder in which the particulate conducting pigment is dispersed is also not particularly limited. Any binder material can be employed which is (1) compatible with the electrically-conductive pigment utilized, (2) compatible with conventional electrostatographic recording elements and (3) which is capable of being applied to the inner surfaces of the holes disposed in conventional electrostatographic recording elements. Since the composition is normally applied as a solvent solution thereof, the binder should be soluble in ordinary and conventional solvents and the composition should be film-forming, such that when the solvent is removed such as by drying, the film remaining comprises the electrically-conductive pigment dispersed in the binder.

The binder may be polymeric in nature including synthetic resin polymers and natural resins. Examples of the former are disclosed in U.S. Pat. No. 3,639,121, York, the disclosure of which is incorporated herein by reference. It is not intended to limit the binder to the polymers described in said patent, and generally any polymer having the above characteristics is useful in the present environment.

Examples of suitable natural resins include gelatin, gum arabic, various cellulose resins, etc. Again the natural resin binder is not particularly limited and any such material having the above characteristics can be employed in the practice of the present invention.

The binder should, of course, exhibit some degree of adhesion toward the electrostatographic recording elements onto which it is coated such that a firm bond is formed between it and the recording element. In addition, the binder should not be reactive with conventional solvents, and should be soluble therein at least to the degree necessary for forming a film from a solution therein. Further, the binder should not possess a high resistivity, and generally, its resistivity will be below $10^{16}$ ohms.

As a general matter, the amount of the electrically-conductive pigment in the binder will vary, with those skilled in the art being able to optimize the amount required. Generally, however, the conductive lacquer of the present invention will contain from 0.5 to 50% by weight of the conductive pigment, based on the weight of the dry composition.

As stated above, the most convenient manner of coating the conductive lacquer of the present invention onto the inner surface of the holes in the recording element is via a solvent solution coating process. The solvent will, of course, vary depending upon the binder employed, and the solvent must of course be compatible with the conductive pigment, the binder and the recording element. Beyond these characteristics, the solvent is not critical and any material which is a solvent for the binder may be employed. Those skilled in the art will be able to select suitable solvents given a particular binder. Typical solvents include a number of organic materials such as aromatic solvents including toluene, benzene, xylene, etc.; various ketones; halogenated aliphatic hydrocarbons such as methylene chloride, ethylene chloride, and various chloroalkanes; ethers such as tetrahydrofuran; and mixtures thereof, and the like.

Mixtures of the electrically-conductive pigments may also be employed, as well as mixtures of binders and mixtures of solvents. The particular composition of the conductive lacquer will vary depending upon the requirements desired.

The thickness of the lacquer coating on the inner surface of the holes in the recording element of the present invention in not particularly critical. The minimum thickness is of course that thickness which is sufficient to provide an effective electrical connection to the intermediate conductive layer of the recording element. The maximum thickness thereof is not particularly limited, and it is actually preferred to make these coatings as thin as possible. Generally, however, the dry thickness of the coatings, after solvent removal, will range from about 3 to about 25 microns, but it is not intended to limit the thickness of such coatings to this range.

It is also to be understood that in addition to the arrangements shown in FIGS. 5 and 6, the conductive lacquer coating of the present invention can be used equally as well with the recording elements having the structure shown in FIG. 3. The technique of the present invention is especially suitable for a recording element having the structure shown in FIG. 3, since it provides excellent electrical contact between the conductive layer 14 (referring now to FIG. 3) and the conductive back layer 16. It is important to provide a good electrical contact between these two conductive layers to assure quality image reproduction.

As pointed out above, the present invention does not per se reside in the composition, basic structure or other characteristics of the recording member per se. The present invention is expressly applicable to any conventional electrostatographic recording member having at least three layers: a support which is electrically insulating, an electrically-conductive layer overlying the support and an uppermost layer which is either photoconductive (in the case of electrophotographic recording members) or a dielectric material having a high volume resistivity (in the case of an electrographic recording member). An optional fourth layer is the conductive back layer as shown in FIG. 3.

One skilled in the art can select appropriate materials to form these conventional recording members. Thus, as the support various materials can be used, such as paper or synthetic resins such as polyesters (e.g., polyethylene terephthalate) or cellulose esters (e.g., cellulose acetate) and the like. Preferably, the support is formed of a transparent material such as polyethylene terephthalate or cellulose acetate when the recording member is to be used as a master in a photographic reproduction process where the information imaged thereon is to be exposed from the back side of the recording member. The thickness of the support may vary depending upon the end use, there being no particular limitation as to the thickness of the support.

The intermediate conducting layer which is coated onto the support, evaporated thereon or formed as a part of the upper surface of the support, can comprise literally any conducting composition. Normally, the conducting layer comprises an electrically-conducting material dispersed in a binder therefor and coated onto the support, such as from a solvent solution thereof. The electrically-conducting material may be the same as that used in applicant's adhesives and the binder may be polymeric in nature, such as polyolefins, vinyl polymers such as polyvinyl chloride, acrylates, methacrylates, polyesters, styrene-butadiene copolymers, polyvinyl acetate, polystyrene, polyamides, polycarbonates, copolymers thereof, etc. Illustrative of the electrically-conducting materials whichh may be employed in such intermediate conducting layers are ionizable polyelectrolyte salts, polymeric quaternary ammoniums salts, polystyrene sulfonic acid salts, salts or copolymers of vinyl compounds with maleic acid, Calgon 261 (a conductivizing resin sold by Merk-Calgon), vinyl acetate, and metal coatings deposited by sputtering or vacuum deposition to render the component electrically cconducting. The thickness of the conducting layer is not particularly limited, and those skilled in the art can vary the thickness as desired.

In an electrophotographic element, the upper layer is photoconductive and normally comprises an organic or inorganic photoconductor dispersed in a binder therefor. Any organic or inorganic photoconductor is useful in the electrophotographic elements of the present invention. Typical organic photoconductors include, for example, quinacridones, carboxamides, carboxanilides, triazines, anthraquinones, azo compounds, salts and lakes of compounds derived from 9-phenylxanthane, dioxazines, lakes of fluorescein dyes, pyrenes, phthalocyaninos, metal salts and lakes of azo dyes, polyvinyl carbazole, substituted phenylene diamines, and the like. Several substituted phenylene diamines are described in detail in U.S. Pat. Nos. 3,314,788 issued Apr. 18, 1967 to Mattor and 3,615,404 issued Oct. 26, 1971 to Price et al. The amount of the photoconductive material in the photoconductive layer is at least the minimum required to render the layer photoconductive, with the amount generally varying from 5% to 65% by weight, based on the weight of the photoconductive layer. The disclosures of the aforementioned Mattor and Price et al patents are hereby incorporated herein by reference for their disclosures of suitable photoconductive materials.

Also operable in the photoconductive layer, and preferred, are sensitizing compounds which further increase the sensitivity of the photoconductive materials to light of certain wavelengths. Any conventional sensitizing compounds may be employed in the photoconductive layer of the present invention to be used in combination with related photoconductive materials to further increase the sensitization of the photoconductive layer. The amount of the sensitizer in the photoconductive layer can vary within wide ranges, with the optimum concentration in any given case varying with the specific photoconductor employed and the sensitizing compound used. Normally, sensitizers are employed in amounts of from 0.05% to 0.3% by weight, based on the weight of the photoconductive layer, or about 3 ml. of a 1% solution of the sensitizer for each 25 grams of photoconductor employed.

The photoconductor layer may be coated onto the electrically-conductive intermediate layer such as from a solvent solution of the composition. The solvent will of course vary depending upon the photoconductor and sensitizer, if one is present, and the binder. Those skilled in the art can certainly practice the present invention using various solvents with a minimum amount of experimentation.

With the electrographic recording elements of the present invention, the support and intermediate electrically-conductive layers would be the same and can be formed of any of the above described materials. The upper layer is formed of a material having a high volume resistivity, preferably a minimum of $10^{12}$ ohm-centimeters. Typical materials are as follows: styrenebutadiene copolymers; silicone resins; styrene-alkyd resins; silicone alkyd resins; soya-alkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methylmethacrylate), poly(n-butyl-methacrylate), poly(isobutyl methacrylate), etc.; polystyrene; nitrated polystyrene; polymethylstyrene; isobutylene polymers; polyesters, such as poly (ethyleneal-karylocyalkylene terephthalate); phenol-formaldehyde resins; ketone resins; polyamide; polycarbonates; polythiocarbonates; poly(ethyleneglycol-co-bishydroxyethoxphenyl propane terephthalate); etc. Methods of making resins of this type have been described in the prior art, for example, styrene-alkyd resins can be prepared according to the method described in U.S. Pat. Nos. 2,361,019 and 2,258,423. Suitable resins of the type contemplated for use in the photoconductive layers of the invention are sold under such trade names as Vitel PE-101, Cymac, Piccopale 100, and Saran F-220 and Lexan 105. Other types of binders which can be used in the photoconductive layers of the invention include such materials as paraffin, mineral waxes, etc.

With regard to the electrically-conductive back layer used in certain embodiments, this can be formed of materials which are similar to or the same as the intermediate electrically-conductive layer. In addition, both of these conductive layers can be formed of electrically-conductive materials per se instead of conductive pigments dispersed in a binder. For example, U.S. Pat. No. 3,011,918 discloses a conductive resinous polymer, polyvinyl benzyl trimethyl ammonium chloride, which is itself conductive. Alternatively, these layers may be made by printing or coating the support surface with an electroconductive ink, or a metal or a suitable semi-conductor may be vacuum deposited or sputtered onto the support. See, for example, U.S. Pat. Nos. 3,207,625; 2,756,165; 3,148,083; 3,245,833; and 3,428,451.

As will be apparent from the above description, the preferred compositions are those which provide a flexible recording member, and particularly those materials are preferred which are flexible and transparent to provide a transparent recording member. In addition, it is preferred that the support be substantially electrically insulating in nature.

While the invention has been shown and described with reference to preferred embodiments thereof, it is to be expressly understood that various changes and modifications may be made without departing from the spirit and scope of the present invention, as defined in the appended claims.

What is claimed is:

1. In an electrostatographic recording member comprising at least:

(1) an electrically-insulating substrate;

(2) an electrically-conductive intermediate layer overlying a first surface of said substrate; and (3) an electrically-insulating outer layer overlying said conductive layer, said outer layer containing a photoconductive material or being composed of a dielectric material of high volume resistivity;

the improvement comprising a combined means for accurately positioning said recording member during imaging thereof and for establishing an electrical ground connections to said intermediate conductive layer, said combined means comprising at least two separate holes through said recording member in a non-image area thereof and a conductive lacquer coating on the inner surface of at least one of said holes, said holes being adapted to receive protrusions during imaging to accurately position said recording member and said conductive lacquer being in electrical contact with the exposed intermediate conductive layer on the inner surface of said hole.

2. The electrostatographic recording member of claim 1 further comprising a conductive back layer coated onto a second surface of said substrate opposite said first surface.

3. The electrostatographic recording member of claim 1 wherein two holes are provided in a non-image area of said recording member, one of said holes being circular and the other of said holes being elongated.

4. The electrostatographic recording member of claim 1 wherein said conductive lacquer comprises a finely divided electrically-conductive pigment dispersed in a binder therefor.

5. The electrostatographic recording member of claim 1 wherein said conductive lacquer is coated both on the inner surfaces of said hole and on an area surrounding the opposite ends of said hole on the opposite surfaces of said recording member.

6. The electrostatographic recording member of claim 1 wherein said conductive lacquer is coated only on the inner surfaces of said hole.

7. The electrostatographic recording member of claim 1 wherein said recording member is flexible.

8. The electrostatographic recording member of claim 1 wherein said recording member is transparent and flexible.

9. The electrostatographic recording member of claim 1 wherein said conductive lacquer is coated on the inner surface of all of said holes.

10. A process for making combination means for accurately positioning an electrostatographic recording member during imaging thereof and for establishing an electrical ground connection with an intermediate conductive layer of said recording member, said recording member comprising at least:

an electrically-insulating substrate;

an electrically-conductive intermediate layer overlying a first surface of said substrate; and an electrically-insulating outer layer overlying said conductive layer, said outer layer containing a photoconductive material or being composed of a dielectric material of high volume resistivity; said process comprising:

forming at least two separate holes through said recording member in a non-image area thereof to expose said intermediate conductive layer, said holes being adapted to receive protrusions during imaging to accurately position said recording member; and coating the inner surface of at least one of said holes with a conductive lacquer to form an electrical contact with the exposed intermediate conductive layer.

* * * * *